United States Patent
Fujisaki et al.

(10) Patent No.: US 12,153,012 B2
(45) Date of Patent: Nov. 26, 2024

(54) GAS SENSOR

(71) Applicant: NGK INSULATORS, LTD., Nagoya (JP)

(72) Inventors: Megumi Fujisaki, Kuwana (JP); Mika Takeuchi, Nagoya (JP); Takahiro Tomita, Chita (JP)

(73) Assignee: NGK INSULATORS, LTD., Nagoya (JP)

( * ) Notice: Subject to any disclaimer, the term of this patent is extended or adjusted under 35 U.S.C. 154(b) by 708 days.

(21) Appl. No.: 17/370,175

(22) Filed: Jul. 8, 2021

(65) Prior Publication Data
US 2021/0341413 A1    Nov. 4, 2021

Related U.S. Application Data

(63) Continuation of application No. PCT/JP2019/000584, filed on Jan. 10, 2019.

(51) Int. Cl.
*G01N 27/407* (2006.01)
*G01N 27/409* (2006.01)
*G01N 27/416* (2006.01)

(52) U.S. Cl.
CPC ..... *G01N 27/4075* (2013.01); *G01N 27/4077* (2013.01); *G01N 27/409* (2013.01); *G01N 27/416* (2013.01)

(58) Field of Classification Search
CPC ................. G01N 27/4075; G01N 27/4077
See application file for complete search history.

(56) References Cited

U.S. PATENT DOCUMENTS

| | | | |
|---|---|---|---|
| 5,766,434 A | 6/1998 | Fujii et al. | |
| 2014/0130572 A1 | 5/2014 | Otsuka et al. | |
| 2014/0291150 A1 | 10/2014 | Otsuka et al. | |

FOREIGN PATENT DOCUMENTS

| | | | | |
|---|---|---|---|---|
| JP | 56-090255 A | | 7/1981 | |
| JP | 5-301789 A | | 11/1993 | |
| JP | 08-094576 A | | 4/1996 | |
| JP | 10-221296 A | | 8/1998 | |
| JP | 2002-273137 A | | 9/2002 | |
| JP | 2003-279528 A | | 10/2003 | |
| JP | 2009-080110 A | | 4/2009 | |
| JP | 2013-104706 A | | 5/2013 | |
| JP | 2014-098590 A | | 5/2014 | |
| JP | 2015059758 A | * | 3/2015 | ............. G01N 27/41 |
| JP | 2015069758 A | * | 3/2015 | ............. G01N 27/41 |

OTHER PUBLICATIONS

EPO machine-generated English language translation of Sakuma et al. JP 2015069758 A, downloaded Mar. 21, 2024, patented Mar. 30, 2015 (Year: 2015).*
International Search Report of PCT/JP2019/000584 dated Feb. 26, 2019.

* cited by examiner

*Primary Examiner* — Alexander S Noguerola
(74) *Attorney, Agent, or Firm* — MATTINGLY & MALUR, PC (57) ABSTRACT

A gas sensor has a porous protective layer disposed on a surface of a sensor element. In this gas sensor, the porous protective layer includes ceramic particles and ceramic fibers. Further, the ceramic fibers are present in the porous protective layer over a range from a front surface to a back surface thereof.

7 Claims, 4 Drawing Sheets

| | First Slurry | | | Second Slurry | | | (vol%) |
|---|---|---|---|---|---|---|---|
| | Alumina Fiber | Plate-shaped Alumina Particle | Titania Particle | Alumina Fiber | Alumina Particle | Titania Particle | |
| Sample 1 | 10 | 34 | 56 | 44 | 0 | 56 | |
| Sample 2 | 20 | 24 | 56 | 44 | 0 | 56 | |
| Sample 3 | 44 | 0 | 56 | 44 | 0 | 56 | |
| Sample 4 | 0 | 44 | 56 | 0 | 60 | 56 | |
| Sample 5 | 44 | 0 | 56 | 0 | 60 | 40 | |

FIG. 4

|  | Porosity (%) | | Post-firing Appearance | Wetting Test | |
|---|---|---|---|---|---|
|  | First Layer | Second Layer |  | Porous Protective Layer | Sensor Element |
| Sample 1 | 51 | 28 | ○ | ○ | ○ |
| Sample 2 | 52 | 28 | ○ | ○ | ○ |
| Sample 3 | 56 | 28 | ○ | ○ | ○ |
| Sample 4 | 61 | 28 | × | ○ | × |
| Sample 5 | 56 | 28 | × | × | × |

GAS SENSOR

CROSS-REFERENCE TO RELATED APPLICATION

This application is a continuation application of PCT/JP2019/000584, filed on Jan. 10, 2019, the contents of which is hereby incorporated by reference.

TECHNICAL FIELD

The disclosure herein discloses art related to a gas sensor.

BACKGROUND ART

A gas sensor in which a surface of a sensor element is protected by a porous protective layer is known. This type of gas sensor is disposed for example in an exhaust system of a vehicle having an engine, and is used for measuring a gas concentration of specific gas included in exhaust gas. Japanese Patent Application Publication No. 2014-98590 (hereinbelow termed Patent Document 1) describes a gas sensor of which porous protective layer has a two-layer structure. The gas sensor of Patent Document 1 is configured such that a porosity of a lower layer (layer in contact with a sensor element) is higher than a porosity of an upper layer (layer exposed to an exhaust gas space), by which it catches harmful components included in exhaust gas at the fine upper layer (having a lower porosity) and increases heat insulation performance of the porous protective layer. Further, in the gas sensor of Patent Document 1, since strength of the lower layer decreases as the porosity of the lower layer is increased, this decrease in the strength is addressed by adding ceramic fibers in the lower layer.

SUMMARY OF INVENTION

Technical Problem

In the gas sensor of Patent Document 1, the porous protective layer having the two-layer structure in which the upper layer is constituted solely of ceramic particles and the lower layer is constituted of ceramic particles and the ceramic fibers is used to protect the sensor element. However, Patent Document 1 is insufficient in regard to its countermeasure to a case in which the porous protective layer itself is damaged. That is, the sensor element can be protected when the porous protective layer is not damaged, however, when the porous protective layer is damaged, the harmful components could enter the porous protective layer from its damaged portion, and as a result the harmful components could make contact with the sensor element and the sensor element may thereby be damaged. The disclosure herein aims to provide art for increasing durability of a porous protective layer in a gas sensor provided with the porous protective layer.

Solution to Technical Problem

A gas sensor disclosed herein may comprise a porous protective layer disposed on a surface of a sensor element. In this gas sensor, the porous protective layer may include ceramic particles and ceramic fibers, and in a thickness direction of the porous protective layer, the ceramic fibers may be present in a front surface of the porous protective layer and on a back surface side of the porous protective layer relative to a midpoint in the thickness direction. By having the ceramic fibers included in the front surface (surface exposed to outside) of the porous protective layer, this gas sensor can increase strength of a portion (that is, the front surface of the porous protective layer) that could be a starting point of damage caused by harmful components (such as metal and moisture) in exhaust gas. Further, in the thickness direction of the porous protective layer, since the ceramic fibers are included on a front surface side (that is, in the front surface) and on the back surface side relative to the midpoint in the thickness direction, a difference in firing shrinkage amounts between the front surface side and the back surface side is reduced, and generation of a crack can be prevented.

The "porous protective layer including the ceramic particles" refers not only to a configuration in which the ceramic particles are present in the porous protective layer as "particles" but also a configuration in which the ceramic particles are present in the porous protective layer in a state of "sintered body" having been sintered. The ceramic particles are present in the porous protective layer as a matrix (base material) of the porous protective layer or as a bonding material that bonds basic materials constituting the porous protective layer. Further, the "ceramic fibers being present in the front surface of the porous protective layer" means that the ceramic fibers are present in a layer that is located frontmost when the porous protective layer is equally divided into five layers along the thickness direction. That is, it is not necessarily limited to a configuration in which the ceramic fibers are exposed on the front surface of the porous protective layer (being in contact with a space outside the porous protective layer).

In the above gas sensor, the porous protective layer may include plate-shaped ceramic particles. The "plate-shaped ceramic particles" refer to ceramic particles having an aspect ratio of 5 or more and a longitudinal size of 5 μm or more and 50 μm or less. By adding the plate-shaped ceramic particles in the porous protective layer, decrease in strength of the porous protective layer can be mitigated and also a part of the ceramic fibers to be added to the porous protective layer can be omitted. That is, a part of the ceramic fibers in the porous protective layer can be replaced with the plate-shaped ceramic particles while the strength of the porous protective layer is maintained. Typically, a length (longitudinal size) of the plate-shaped ceramic particles is shorter than a length of the ceramic fibers. Due to this, by replacing a part of the ceramic fibers with the plate-shaped ceramic particles, a heat transfer path within the porous protective layer can be obstructed and heat transfer within the porous protective layer tend not to occur. As a result of this, heat insulation performance for the sensor element can further be increased.

When the plate-shaped ceramic particles are included in the porous protective layer, in the thickness direction of the porous protective layer, the plate-shaped ceramic particles may be present on the back surface side relative to the midpoint in the thickness direction. As aforementioned, the plate-shaped ceramic particles contribute to obstruct the heat transfer path in the porous protective layer. Due to this, by virtue of the presence of the plate-shaped ceramic particles near the sensor element (on the back surface side of the porous protective layer relative to the midpoint in the thickness direction), the heat insulation performance for the sensor element can efficiently be exhibited.

In the above gas sensor, a ceramic fiber content may be higher on the front surface side of the porous protective layer than on the back surface side of the porous protective layer. When a crack is generated on the front surface side of the porous protective layer, harmful component enters the porous protective layer from this crack and a damage to the porous protective layer worsens. By having the ceramic fibers in a higher content on the front surface side, which could be a starting point of the damage in the porous protective layer, than on the back surface side, the damage to the porous protective layer can efficiently be reduced without increasing an amount of the ceramic fibers.

In the above gas sensor, the porous protective layer may comprise a first layer located on the back surface side and a second layer located on the front surface side. In this case, a porosity of the first layer may be higher than a porosity of the second layer. That is, the porous protective layer may comprise a multi-layer structure, and the porosity may be higher in a layer on the back surface side (first layer) than in a layer on the front surface side (second layer). By configuring the porous protective layer to comprise the multi-layer structure, characteristics of the porous protective layer on the front surface side and on the back surface side (characteristics attributable to compositions thereof) can easily be controlled. Further, by configuring the porosity on the back surface side (near the sensor element) to be high, the heat insulation performance for the sensor element is increased and a damage to the sensor element is mitigated. A third layer may be disposed between the first and second layers. In this case, the third layer may have the same characteristic as the first or second layer, or may have a different characteristic from the first and second layers.

When the porous protective layer comprises the multi-layer structure including the first and second layers, the first layer may include the ceramic fibers. In this case, a volume fraction of the ceramic fibers in the first layer may range from 5 vol % to 25 vol % relative to a total volume of the ceramic particles, the plate-shaped ceramic particles, and the ceramic fibers. Heat insulation performance of the first layer may be prevented from decreasing while strength of the first layer is maintained.

When the porous protective layer comprises the multi-layer structure including the first and second layers, the first layer and the second layer may be in contact with each other. That is, the porous protective layer may comprise a two-layer structure constituted of the first layer on the back surface side and the second layer on the front surface side. The number of layers for configuring the porous protective layer is minimized and manufacturing process can be prevented from becoming complicated.

DESCRIPTION OF EMBODIMENTS

Hereinbelow, an embodiment of a gas sensor disclosed herein will be described. The gas sensor disclosed herein is used for detecting a concentration of a specific component in air. For example, the gas sensor disclosed herein is used as a $NO_x$ sensor configured to detect a $NO_x$ concentration or an air-fuel ratio sensor (oxygen sensor) configured to detect an oxygen concentration in exhaust gas in a vehicle having an engine.

The gas sensor may include a sensor element and a porous protective layer configured to protect the sensor element. The sensor element may be an element configured to detect a concentration of gas to be detected, and may be in a stick shape. A detection unit configured to detect the gas to be detected may be disposed at one longitudinal end of the stick-shaped sensor element. Further, the sensor element may include a heater therein. The porous protective layer may be disposed on a surface of the sensor element. The porous protective layer may be disposed on a part of the surface of the sensor element, and may be disposed at least on a surface of the detection unit. The porous protective layer may cover an entirety of the surface of the detection unit. Further, a thickness of the porous protective layer may, although this depends on an environment in which it is used, be 100 μm or more and 1000 μm or less, for example. When the thickness of the porous protective layer is too thin, its function to protect the sensor element cannot be sufficiently exhibited, and when it is too thick, the thickness obstructs flow of the gas to be detected into the sensor element. The porous protective layer may be constituted of ceramics, and may be constituted of ceramic particles, plate-shaped ceramic particles, and ceramic fibers.

The ceramic particles may be used as a bonding material that bonds basic materials constituting basic framework of the porous protective layer, such as the plate-shaped ceramic particles and the ceramic fibers. Metal oxide that is chemically stable in high-temperature exhaust gas may be used as a material of the ceramic particles. Such metal oxide may include alumina ($Al_2O_3$), spinel ($MgAl_2O_4$), titania ($TiO_2$), zirconia ($ZrO_2$), magnesia (MgO), mullite ($Al_6O_{13}Si_2$), and cordierite ($MgO \cdot Al_2O_3 \cdot SiO_2$). The ceramic particles may be in a form of particles, and a size thereof (average particle diameter before firing) may be 0.05 μm or more and 1.0 μm or less. When the size of the ceramic particles is too small, sintering in a manufacturing process (firing) of the porous protective layer may progress excessively, and a sintered body tends to shrink. Further, when the size of the ceramic particles is too large, a performance to bond the basic materials cannot efficiently be exhibited. In a thickness direction of the porous protective layer, the size of the ceramic particles may be the same or may vary.

The plate-shaped ceramic particles may be present in an area from a front surface to a back surface of the porous protective layer (over an entirety thereof in the thickness direction) or may be unevenly present in the thickness direction. As a material of the plate-shaped ceramic particles, minerals and clays such as talc ($Mg_3Si_4O_{10}(OH)_2$), mica and kaolin, glass, etc., may be used in addition to the metal oxides used as the material of the ceramic particles as aforementioned. The plate-shaped ceramic particles may be in a rectangular plate shape or a needle shape, and their longitudinal size may be 5 μm or more and 50 μm or less. When the longitudinal size of the plate-shaped ceramic particles (hereinbelow may simply be termed "length of the plate-shaped ceramic particles") is 5 μm or more, excessive sintering of the ceramic particles can be prevented. Further, when the length of the plate-shaped ceramic particles is 50 μm or less, a heat transfer path in the porous protective layer is obstructed by the plate-shaped ceramic particles, and the sensor element can efficiently be insulated from heat.

In the thickness direction of the porous protective layer, the plate-shaped ceramic particles may be present on a back surface side of the porous protective layer relative to a midpoint in the thickness direction. By obstructing the heat transfer path near the sensor element, heat insulation of the sensor element can be ensured. As aforementioned, the plate-shaped ceramic particles may be present in an area from the front surface to the back surface of the porous protective layer, or may be unevenly present in the thickness direction. That is, the area in which the plate-shaped ceramic particles are present may be changed according to a purpose thereof. For example, the plate-shaped ceramic particles may be present only on the back surface side relative to the midpoint in the thickness direction, or may be present only on a front surface side relative to the midpoint in the thickness direction. Alternatively, the plate-shaped ceramic particles may be present on the front surface side relative to the midpoint in the thickness direction in addition to the back surface side relative to the midpoint in the thickness direction. Further, an aspect ratio (longitudinal size/size in a direction orthogonal to a longitudinal direction) of the plate-shaped ceramic particles may be in a range of 5 to 100. When the aspect ratio is 5 or more, the sintering of the ceramic particles can efficiently be mitigated. When it is 100 or less, decrease in strength of the plate-shaped ceramic particles themselves is mitigated, and an effect of strengthening the porous protective layer can be achieved.

In the thickness direction of the porous protective layer, the ceramic fibers may be present on the front surface and on the back surface side of the porous protective layer relative to the midpoint in the thickness direction. In other words, the ceramic fibers may be present on a part of or over the entirety of the front surface of the porous protective layer and the back surface side of the porous protective layer relative to the midpoint. For example, they may be present in the area from the front surface to the back surface of the porous protective layer. That is, the ceramic fibers may be present over the entirety of the porous protective layer in the thickness direction. Specifically, when the porous protective layer is equally divided into five in the thickness direction, the ceramic fibers may be present in all of the layers. However, a ceramic fiber content may be different along the thickness direction of the porous protective layer. Characteristics of the porous protective layer (such as strength and heat transfer property) can be varied along the thickness direction. As an example, the ceramic fiber content of the porous protective layer on the front surface side may be higher than the ceramic fiber content of the porous protective layer on the back surface side. In this case, the strength on the front surface side where damage caused by the gas to be detected is likely larger can be increased, and the heat transfer path can be reduced on the back surface side where heat insulation performance is required.

As a material of the ceramic fibers, glass may be used in addition to the metal oxide used as the material of the plate-shaped ceramic particles as aforementioned. A length of the ceramic fibers may be 50 µm or more and 200 µm or less. Further, a diameter (average diameter) of the ceramic fibers may be in a range of 1 to 20 µm. A type of the ceramic fibers (such as material and size thereof) to be used may be varied along the thickness direction of the porous ceramic layer.

The porous protective layer may comprise multiple layers along the thickness direction. That is, the porous protective layer may comprise a multi-layer structure in which the multiple layers are layered. The number of the layers constituting the porous protective layer may be "2", or may be "3" or more. For example, among the multiple layers constituting the porous protective layer, when a layer located backmost on the back surface side (sensor element side) is considered as being a first layer and a layer located frontmost on the front surface side (gas to be detected environment side) is considered as being a second layer, the first layer and the second layer may be in contact with each other, or other layer(s) may be interposed between the first layer and the second layer. As aforementioned, the porous protective layer may have varied structures along the thickness direction depending on required characteristics. By configuring the porous protective layer in the multi-layer structure, the structure thereof may easily be varied on the back surface side (first layer) and on the front surface side (second layer). However, as the number of the layers in the porous protective layer increases, the manufacturing process becomes more complicated. In order to control the characteristics along the thickness direction as well as to avoid the manufacturing process from becoming complicated, the number of the layers in the porous protective layer may be "2" or "3". When the porous protective layer comprises the multi-layer structure, the ceramic fibers may be included in at least one of the layer on the front surface side (second layer) and the layer(s) on the back surface side relative to the midpoint in the thickness direction. Alternatively, the ceramic fibers may be included in all of the layers.

When the porous protective layer comprises the multi-layer structure, a porosity of the first layer may be higher than a porosity of the second layer. In this case, porosity adjustment may be carried out by adjusting a ratio of materials constituting each layer, or by adding a pore-forming agent in raw materials for fabricating the respective layers. Specifically, an amount of the pore-forming agent to be added to the raw material of the first layer may be larger than an amount of the pore-forming agent added to the raw material of the second layer. By configuring the porosity of the first layer to be high, heat insulation performance for the sensor element can be increased.

The porosity of the first layer may be 20% or more and 85% or less. When the porosity of the first layer is 20% or more, sufficient heat insulation performance can be ensured, and further, obstruction of flow of the gas to be detected into the sensor element can be prevented. Further, when the porosity of the first layer is 85% or less, sufficient strength can be provided.

The porosity of the second layer may be 5% or more and 50% or less. When the porosity of the second layer is 5% or more, obstruction of the flow of the gas to be detected into the sensor element can be prevented, and when the porosity is 50% or less, sufficient strength can be provided. As aforementioned, when a damage such as a crack is generated in the second layer, harmful component (such as metal and moisture) could reach the first layer from this damaged portion, and the harmful component could flow through the first layer and damage the sensor element. Due to this, the porosity of the second layer may be lower than the porosity of the first layer.

As aforementioned, the area within the porous protective layer in which the plate-shaped ceramic particles are present may be different according to purpose. Due to this, when the porous protective layer comprises the multi-layer structure, the plate-shaped ceramic particles may be included in both the first and second layers, or the plate-shaped ceramic particles may be included in the first layer while the plate-shaped ceramic particles are not included in the second layer. Specifically, the first layer may substantially be constituted of the plate-shaped ceramic particles and the ceramic particles (and the ceramic fibers if necessary), and the second layer may substantially be constituted of the ceramic fibers and the ceramic particles. As aforementioned, high heat insulation performance is required in the first layer, and high strength is required in the second layer. Due to this, by adding to the first layer the plate-shaped ceramic particles with excellent balance in reinforcement of the protective layer and heat insulation and adding to the second layer the ceramic fibers with excellence in reinforcement without adding the plate-shaped ceramic particles thereto, the porous protective layer as a whole may exhibit balanced characteristics. As above, by configuring the porous protective layer to comprise the multi-layer structure, the characteristics in the thickness direction can easily be varied.

When the porous protective layer includes the multi-layer structure, the ceramic fibers may be included in the first layer. In this case, a volume fraction of the ceramic fibers in the first layer may range from 5 vol % to 25 vol % relative to a total volume of the ceramic particles, the plate-shaped ceramic particles, and the ceramic fibers. When the 5 vol % or more ceramic fibers are included in the first layer, shrinkage of the ceramic particles in the first layer during firing can sufficiently be mitigated, as a result of which the porous protective layer can be prevented from cracked, and decrease in the strength of the porous protective layer can be prevented. Further, by configuring the volume fraction of the ceramic fibers to be 25 vol % or less, a heat transfer path in the first layer can be obstructed, and heat insulation effect can sufficiently be achieved. The volume fraction of the ceramic fibers is preferably 25 vol % or less. Further, as aforementioned, the ceramic fibers may be present in an area from the front surface to the back surface of the porous protective layer. That is, the ceramic fibers may be included in both the first and second layers.

As aforementioned, the porous protective layer may be constituted of the ceramic particles, the plate-shaped ceramic particles, and the ceramic fibers. Other than these materials, the porous protective layer may be fabricated by further using a raw material in which a binder, a pore-forming agent, and a solvent are mixed. As the binder, an inorganic binder may be used. Alumina sol, silica sol, titania sol, and zirconia sol may exemplify the inorganic binder. These inorganic binders can improve the post-firing strength of the porous protective layer. A polymer-based pore-forming agent, and carbon-based powder may be used as the pore-forming agent. Specifically, acrylic resin, melamine resin, polyethylene particles, polystyrene particles, carbon black powder, and graphite powder may be used. The pore-forming agent may be in various forms according to a purpose, and may for example be spherical, plate-shaped, and fibrous. The porosity and pore size of the porous protective layer can be adjusted by selecting an adding amount, size, and shape of the pore-forming agent. The solvent may be of any kind so long as it is capable of adjusting viscosity of the raw material without affecting other properties of the raw material, and for example, water, ethanol, and isopropyl alcohol (IPA) may be used.

In the gas sensor disclosed herein, the aforementioned raw material may be applied onto the surface of the sensor element, and the porous protective layer may be disposed on the surface of the sensor element by drying and firing the same. Dip coating, spin coating, spray coating, slit-die coating, thermal spraying, aerosol deposition (AD) method, printing, and mold casting may be used as an application method of the raw material.

Among the aforementioned application methods, dip coating is advantageous in that the raw material can be applied evenly over an entirety of the surface of the sensor element with a single application. In dip coating, slurry viscosity of the raw material, a drawing speed of an object to be applied (the sensor element), a drying condition of the raw material, and a firing condition are adjusted in accordance with a type of the raw material and its application thickness. As an example, the slurry viscosity is adjusted to be from 500 to 7000 mPa·s. The drawing speed is adjusted to be from 0.1 to 10 mm/s. The drying condition is adjusted such that a drying temperature is from a room temperature to 300° C. and drying time is 1 minute or more. The firing condition is adjusted such that a firing temperature is from 800 to 1200° C., firing time is from 1 to 10 hours, and firing atmosphere is open air. When the porous protective layer is to be given the multi-layer structure, firing may be carried out after having formed the multi-layer structure by repeating dipping and drying, or the multi-layer structure may be formed by performing dipping, drying, and firing for each layer.

Figure 1:
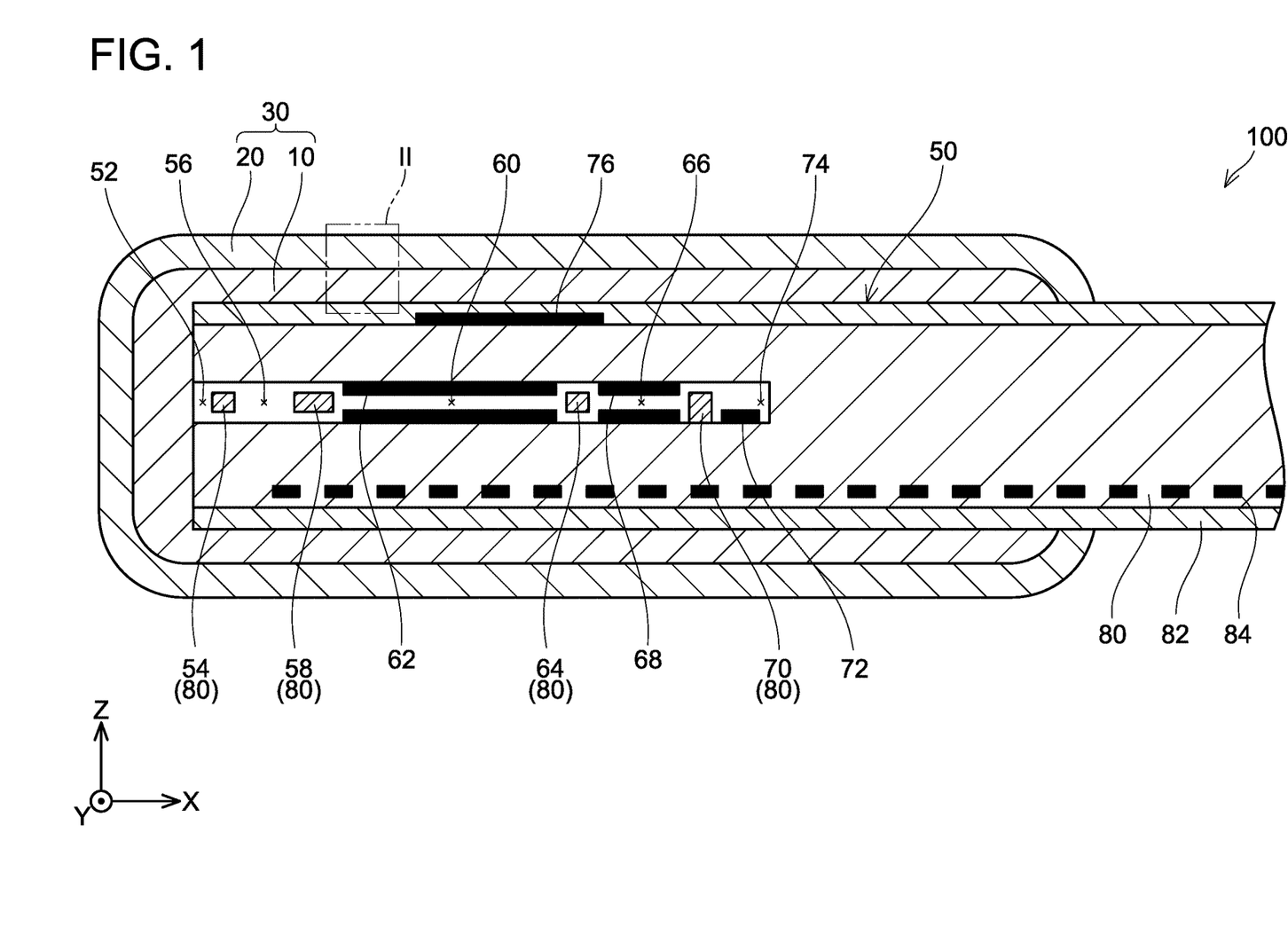
FIG. 1 shows a cross-sectional view of a primary part of a gas sensor.

A gas sensor 100 will be described with reference to FIGS. 1 and 2. As shown in FIG. 1, the gas sensor 100 includes a stick-shaped sensor element 50 extending in an X-axis direction, and a porous protective layer 30. The gas sensor 100 may for example be attached to an exhaust pipe of a vehicle having an engine and be configured to measure a concentration of gas to be detected (NOx, oxygen) within exhaust gas. FIG. 1 shows one end of the gas sensor 100 (sensor element 50) in a longitudinal direction (X-axis direction).

The sensor element 50 is a limiting current type gas sensor element. The sensor element 50 is configured of a base 80 primarily constituted of zirconia, electrodes 62, 68, 72, 76 disposed inside and outside the base 80, and a heater 84 embedded in the base 80. Front and back surfaces (Z+ end surface and Z− end surface) of the base 80 each have a coating layer 82 constituted of alumina disposed thereon. The coating layers 82 protect the front and back surfaces of the base 80 and an outer pump electrode 76 to be described later.

The base 80 has oxygen ion conductivity. A space having an opening 52 is defined within the base 80, and this is sectioned into a plurality of spaces 56, 60, 66, and 74 by diffusion controlling bodies 54, 58, 64, and 70. The diffusion controlling bodies 54, 58, 64, and 70 are parts of the base 80, and are pillar-shaped members extending from both side surfaces (both ends in a Y-axis direction). The diffusion controlling bodies 54, 58, 64, and 70 do not completely separate the respective spaces 56, 60, 66, and 74. The respective spaces 56, 60, 66, and 74 communicate via small gaps. The diffusion controlling bodies 54, 58, 64, and 70 are configured to restrict moving speed of the gas to be detected introduced from the opening 52.

The space inside the base 80 is sectioned into a buffer space 56, a first space 60, a second space 66, and a third space 74 in this order from an opening 52 side. A cylindrical inner pump electrode 62 is disposed in the first space 60. A cylindrical auxiliary pump electrode 68 is disposed in the second space 66. A measurement electrode 72 is disposed in the third space 74. The inner pump electrode 62 and the auxiliary pump electrode 68 are constituted of material(s) having a low performance in $NO_x$ reduction. On the other hand, the measurement electrode 72 is constituted of a material having a high performance in $NO_x$ reduction (functioning as a catalyst for $NO_x$ reduction). Further, the outer pump electrode 76 is disposed on a front surface of the base 80. The outer pump electrode 76 faces a part of the inner pump electrode 62 and a part of the auxiliary pump electrode 68 across the base 80.

An oxygen concentration of the gas to be detected in the first space 60 is adjusted by applying a voltage between the outer pump electrode 76 and the inner pump electrode 62. Similarly, the oxygen concentration of the gas to be detected in the second space 66 is adjusted by applying a voltage between the outer pump electrode 76 and the inner pump electrode 68. The gas to be detected of which oxygen concentration has been highly precisely adjusted is introduced into the third space 74. In the third space 74, $NO_x$ in the gas to be detected is decomposed by the measurement electrode ($NO_x$ reduction catalyst) 72, and oxygen is thereby generated. A voltage is applied to the outer pump electrode 76 and the measurement electrode 72 such that an oxygen partial pressure in the third space 74 is uniformized, and a $NO_x$ concentration in the gas to be detected is detected by detecting a current value during this voltage application. The buffer space 56 is a space for buffering changes in a concentration of the gas to be detected introduced from the opening 52. In detecting the $NO_x$ concentration in the gas to be detected, the base 80 is heated to 500° C. or more by using the heater 84.

The heater 84 is embedded in the base 80 so as to face positions where the electrodes 62, 68, 72, 76 are disposed in order to increase the oxygen ion conductivity of the base 80. The heater 84 is covered by an insulator (not shown), and is not in direct contact with the base 80. By increasing a temperature of the base 80 by using the heater 84, the base (oxygen ion conductivity solid electrolyte) 80 is activated.

The porous protective layer 30 is disposed on an outer surface of the base 80 so as to surround the spaces 56, 60, 66, and 74 in the base 80, that is, a $NO_x$ concentration detection unit of the sensor element 50. The porous protective layer 30 has a two-layer structure, and includes a first layer 10 located on a sensor element 50 side (back surface side) and a second layer 20 located on an external space side (front surface side) of the gas sensor 100. The first layer 10 and the second layer 20 differ in their compositions.

Figure 2:
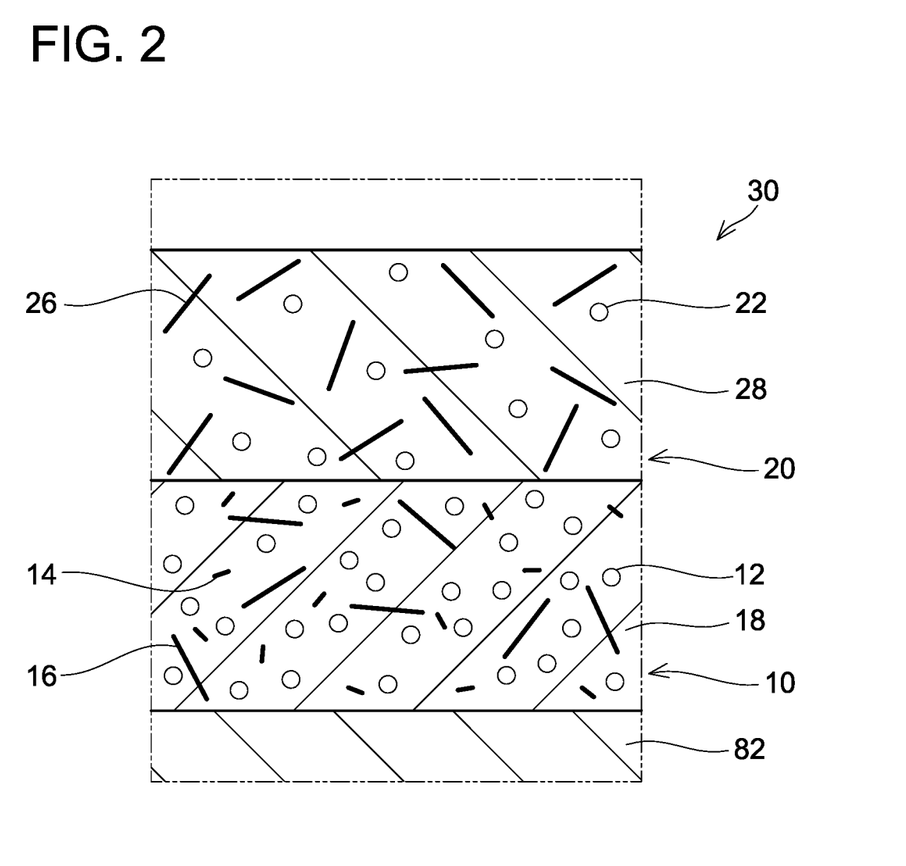
FIG. 2 schematically shows a porous protective layer.

FIG. 2 schematically shows materials that constitute the porous protective layer 30 (first layer 10 and second layer 20). As shown in FIG. 2, the first layer 10 is disposed on front surfaces of the coating layers 82, and the second layer 20 is disposed on a front surface of the first layer 10. The first layer 10 is configured of a matrix 18, ceramic fibers 16, and plate-shaped ceramic particles 14. The matrix 18 is a sintered body of ceramic particles, and bonds the ceramic fibers 16 and the plate-shaped ceramic particles 14 being basic materials. The ceramic fibers 16 and the plate-shaped ceramic particles 14 are present by being substantially evenly dispersed within the first layer 10.

Pores 12 are arranged inside the first layer 10. The pores 12 are voids generated by dissipation of a pore-forming agent that was added to a raw material upon fabricating the first layer 10. That is, the pores 12 are generated by the pore-forming agent dissipating in a manufacturing process (firing) of the porous protective layer 30. Aside from the pores 12, voids are present in the matrix 18 in the first layer 10 as well. Porosity of the first layer 10 is adjusted to be in a range of 20 to 85%.

The second layer 20 is configured of a matrix 28 and ceramic fibers 26. That is, the plate-shaped ceramic particles 14 are not present in the second layer 20. The matrix 28 is a sintered body of ceramic particles, and bonds the ceramic fibers 26 being basic materials. The ceramic fibers 26 are present by being substantially evenly dispersed within the second layer 20. A volume of the basic materials and the matrix in the second layer 20 is adjusted to be substantially equal to the basic materials and the matrix in the first layer 10. Due to this, a content of the ceramic fibers 26 in the second layer 20 (ratio thereof to the second layer) is higher than a content of the ceramic fibers 16 in the first layer 10 (ratio thereof to the first layer).

As aforementioned, the gas sensor 100 is configured to detect the $NO_x$ concentration in the gas to be detected in a state of having the base 80 heated by the heater 84 embedded in the base 80. Due to this, when moisture in the gas to be detected makes contact with the sensor element 50, the sensor element 50 (base 80) could be damaged by thermal impact, and $NO_x$ detection accuracy of the sensor element 50 could be decreased, or $NO_x$ detection could be disabled. By protecting the sensor element 50 ($NO_x$ detection unit) with the porous protective layer 30, the moisture in the gas to be detected is prevented from making contact with the sensor element 50, and durability of the gas sensor 100 is thereby improved.

EXAMPLES

Figure 3:
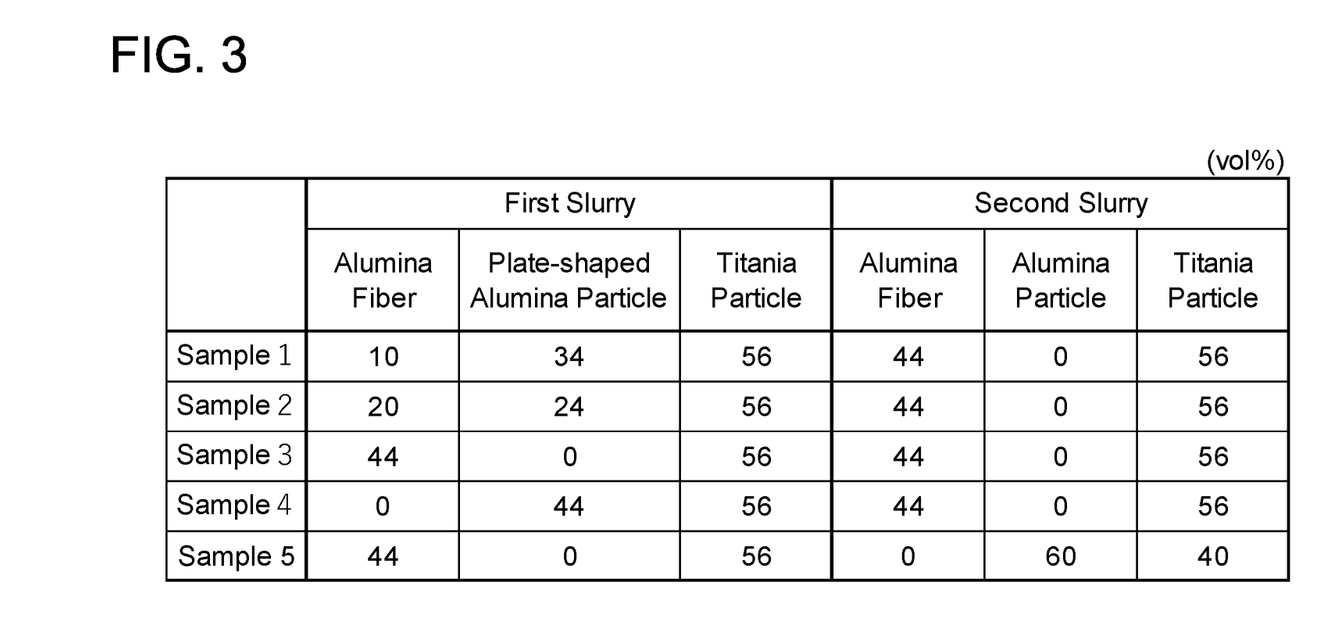
FIG. 3 shows a composition of the porous protective layer of an embodiment.
Figure 4:
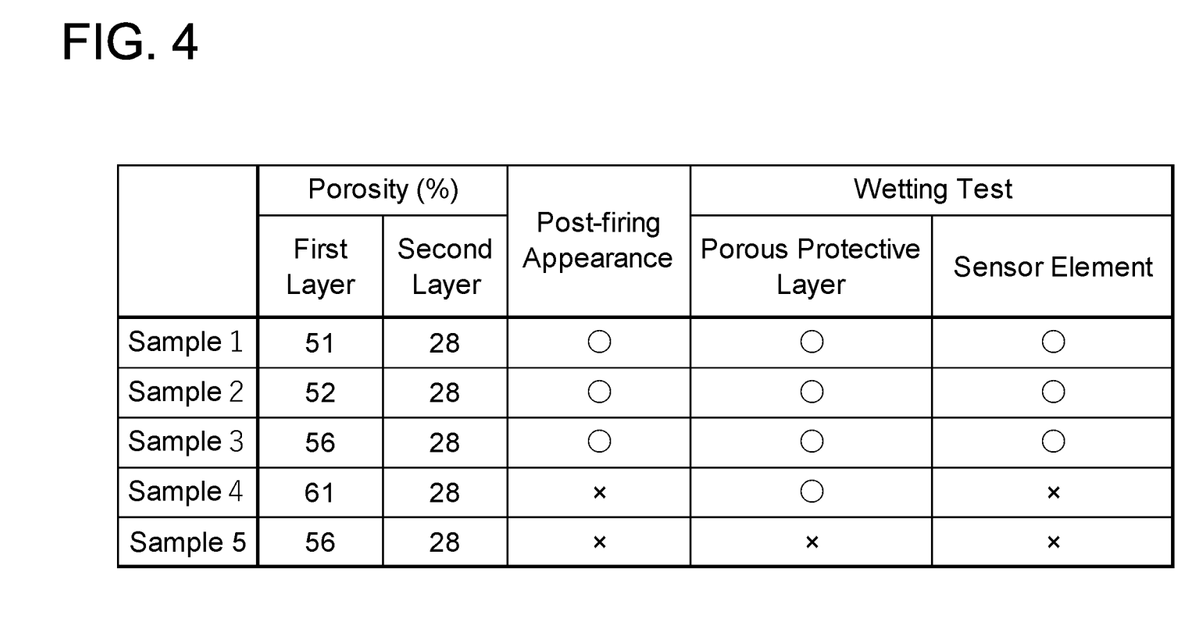
FIG. 4 shows an evaluation result of the embodiment.

Five types of gas sensors 100 (samples 1 to 5) having the porous protective layers 30 configured from different materials were fabricated, and characteristics of the gas sensors 100 (porous protective layers 30) were evaluated. FIG. 3 shows formulations of slurries used to fabricate the respective samples, and FIG. 4 shows evaluation results of the respective samples.

Application of the porous protective layer 30 onto each of the sensor elements 50 was respectively carried out by dipping. Specifically, a slurry for the first layer (first slurry) and a slurry for the second layer (second slurry) were prepared, one end of the sensor element 50 was immersed in the first slurry and a 300 μm first layer was thereby formed. After this, the sensor element 50 was placed in a dryer, and the first layer was dried for one hour at 200° C. (in open air atmosphere). Next, a portion of the sensor element 50 where the first layer was formed was immersed in the second slurry and a 300 μm second layer was thereby formed. After this, the sensor element 50 was placed in the dryer, and the second layer was dried for one hour at 200° C. (in open air atmosphere). Then, the sensor element 50 was placed in an electric furnace, and the first and second layers were fired for three hours at 1100° C. (in open air atmosphere).

The first slurry will be described. The first slurry was prepared by mixing alumina fibers (average fiber length: 140 μm), plate-shaped alumina particles (average particle diameter: 6 μm), titania particles (average particle diameter: 0.25 μm), alumina sol (alumina content: 1.1%), acrylic resin (average particle diameter: 8 μm), and ethanol.

The alumina fibers and the plate-shaped alumina particles correspond to the basic materials, and the titania particles correspond to a bonding agent. In the respective samples (samples 1 to 5), the alumina fibers, the plate-shaped alumina particles, and the titania particles were measured to be in volume ratios shown in FIG. 3. The alumina sol corresponds to a binder (inorganic binder). The alumina sol was added by 10 wt % relative to a total weight of the basic materials and the bonding agent. The acrylic resin corresponds to the pore-forming agent, and was added such that the pore-forming agent was 60 vol % relative to a total volume of the basic materials, the bonding agent, and the pore-forming agent. The ethanol is a solvent, and was adjusted such that viscosity of the first slurry was 2000 mPa·s.

The second slurry will be described. The second slurry was prepared by mixing alumina fibers, titania particles, alumina sol, acrylic resin, and ethanol. The alumina fibers, the titania particles, the alumina sol, the acrylic resin, and the ethanol used hereof were the same as those used in the first slurry. In the second slurry, the alumina fibers correspond to the basic materials and the titania particles correspond to the bonding agent. In the respective samples (samples 1 to 5), the alumina fibers and the titania particles were measured to be in volume ratios shown in FIG. 3. The alumina sol (inorganic binder) was added by 10 wt % relative to a total weight of the basic materials and the bonding agent. The acrylic resin (pore-forming agent) was added such that the pore-forming agent was 20 vol % relative to a total volume of the basic materials, the bonding agent, and the pore-forming agent. The ethanol (solvent) was adjusted such that viscosity of the second slurry was 2000 mPa·s.

The alumina fibers and the plate-shaped alumina particles correspond to the basic materials and the titania particles correspond to the bonding agent. In the respective samples (samples 1 to 5), the alumina fibers, the plate-shaped alumina particles, and the titania particles were measured to be in volume ratios shown in FIG. 3. The alumina sol corresponds to the binder (inorganic binder). The alumina sol was added by 10 wt % relative to a total weight of the basic materials and the bonding agent. The acrylic resin corresponds to the pore-forming agent, and was added such that the pore-forming agent was 60 vol % relative to a total volume of the basic materials, the bonding agent, and the pore-forming agent. The ethanol is a solvent, and was adjusted such that viscosity of the first slurry was 2000 mPa·s. In the sample 5, alumina particles (average particle diameter: 20 μm) were used as the basic material.

Porosity measurement, post-firing appearance observation, and wetting test were carried out on the samples 1 to 5. The evaluation results are shown in FIG. 4. The porosity measurement was carried out for each of the first and second layers. Specifically, each layer was observed using a Scanning Electron Microscope (SEM), an observed image was binarized into voids and portions other than the voids, and a ratio of the voids relative to an entirety of the image was calculated. The post-firing appearance observation was carried out by firing the respective samples and cooling them to a room temperature, and thereafter a crack generation in the porous protective layer (second layer) was visibly checked. In FIG. 4, "◯" is given to the sample that was free of crack, and "×" is given to the sample with crack.

In the wetting test, each gas sensor 100 was driven in open air and 20 μL of water droplets were dripped onto its porous protective layer 30, and morphological changes in the porous protective layer 30 and the sensor element 50 were checked. Specifically, the current value flowing between the outer pump electrode 76 and the inner pump electrode 62 was measured in the state where the heater 84 was electrically conducted to bring inside of the first space 60 to a heated state, and the voltage was applied between the outer pump electrode 76 and the inner pump electrode 62 such that the oxygen concentration in the first space 60 is uniformized. 20 μL of water droplets were dripped onto the front surface of the porous protective layer 30 after the current value stabilized. After this, electric conduction of the heater 84 was stopped, and the morphological changes in the porous protective layer 30 and the sensor element 50 were checked.

The morphological change in the porous protective layer 30 was checked by visually observing presence/absence of a crack, delamination, and the like. Further, as the morphological change in the sensor element 50, presence/absence of crack generation was checked by X-ray CT. In FIG. 4, "◯" is given to the sample that was free of crack and delamination, and "×" is given to the sample with crack or delamination. A changing amount in the current value flowing between the outer pump electrode 76 and the inner pump electrode 62 while the water droplets were dripped onto the porous protective layer 30 was also checked.

As shown in FIG. 4, post-firing crack generation in the porous protective layer 30 (second layer 20) was confirmed in the sample in which the first layer 10 does not include the alumina fibers (sample 4) and in the sample in which the second layer 20 does not include the alumina fibers (sample 5). Contrary to this, post-firing crack generation was not confirmed in the samples 1 to 3. This result indicates that a firing shrinkage amount was equalized by containing the alumina fibers (ceramic fibers) over an entirety of the porous protective layer 30 in a thickness direction, and the crack generation was thereby prevented. That is, it is expected as that since the first layer 10 or the second layer 20 of the samples 4 and 5 does not include the alumina fibers, a firing shrinkage amount of a layer not including the alumina fibers became large, resulting in a difference in firing shrinkage amounts in the thickness direction, and a crack was thereby generated.

Further, crack generation in the sensor elements 50 after the wetting test was confirmed in the samples 4 and 5. Contrary to this, no crack was confirmed after the wetting test in the sensor elements 50 of the samples 1 to 3. It is expected as that in each of the samples 4 and 5, moisture had reached the sensor element 50 through the crack generated in the porous protective layer 30 after the firing, and crack was generated in the sensor element 50 by thermal impact. The sample 5 exhibited crack and delamination in the second layer 20 during the wetting test, and the first layer 10 was exposed. On the other hand, progression of the crack in the second layer 20 of the sample 4 as compared to its pre-wetting test state was not confirmed. The samples 1 to 4 each have the alumina fibers (ceramic fibers) included in the porous protective layer 30 on a front surface side (second layer 20). The results of FIG. 4 indicate that strength on the front surface side was increased by the alumina fibers, as a result of which no crack was generated (progression of the crack did not take place) in their porous protective layers 30.

As shown in FIG. 4, the samples 1 to 3 each achieved excellent results in the post-firing appearance observation and the wetting test. As compared to the sample 3, the samples 1 and 2 had smaller changing amounts in the current value that flowed between the pump electrodes 76, 62 during the wetting test. As shown in FIG. 3, in each of the samples 1 and 2, the alumina fiber content in the first layer 10 is less than that of the sample 3. Specifically, in each of the samples 1 and 2, a volume of the alumina fibers is 25 vol % or less relative to the total volume of the basic materials and the bonding agent (alumina fibers, plate-shaped alumina particles, and titania particles). This result indicates that heat insulating performance of the porous protective layer 30 is further increased by adjusting the volume of the alumina fibers to be 25 vol % or less relative to the total volume of the basic materials and the bonding agent.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A gas sensor comprising:
a porous protective layer disposed on a surface of a sensor element, wherein
the porous protective layer includes ceramic particles and ceramic fibers, and
in a thickness direction of the porous protective layer, the ceramic fibers are present on a front surface of the porous protective layer and on a back surface side of the porous protective layer relative to a midpoint in the thickness direction,
the porous protective layer includes plate-shaped ceramic particles,
in the thickness direction of the porous protective layer, the plate-shaped ceramic particles are present on the back surface side relative to the midpoint in the thickness direction, and
a ceramic fiber content is higher on a front surface side of the porous protective layer than on the back surface side of the porous protective layer.

2. The gas sensor according to claim 1, wherein
the porous protective layer comprises a multi-layer structure including a first layer located on the back surface side and a second layer located on a front surface side, and
a porosity of the first layer is higher than a porosity of the second layer.

3. The gas sensor according to claim 2, wherein
the first layer includes the ceramic fibers, and
a volume fraction of the ceramic fibers in the first layer ranges from 5 vol % to 25 vol % relative to a total volume of the ceramic particles and the ceramic fibers.

4. The gas sensor according to claim 3, wherein the first layer and the second layer are in contact with each other.

5. A gas sensor comprising:
a porous protective layer disposed on a surface of a sensor element, wherein
the porous protective layer includes ceramic particles and ceramic fibers,
in a thickness direction of the porous protective layer, the ceramic fibers are present on a front surface of the porous protective layer and on a back surface side of the porous protective layer relative to a midpoint in the thickness direction, and
a ceramic fiber content is higher on a front surface side of the porous protective layer than on the back surface side of the porous protective layer.

6. A gas sensor comprising:
a porous protective layer disposed on a surface of a sensor element, wherein
the porous protective layer includes ceramic particles and ceramic fibers,
in a thickness direction of the porous protective layer, the ceramic fibers are present on a front surface of the porous protective layer and on a back surface side of the porous protective layer relative to a midpoint in the thickness direction,
the porous protective layer comprises a multi-layer structure including a first layer located on the back surface side and a second layer located on a front surface side,
a porosity of the first layer is higher than a porosity of the second layer,
the first layer includes the ceramic fibers, and
a volume fraction of the ceramic fibers in the first layer ranges from 5 vol % to 25 vol % relative to a total volume of the ceramic particles and the ceramic fibers.

7. The gas sensor according to claim 2, wherein the first layer and the second layer are in contact with each other.

* * * * *